United States Patent [19]
Jordan et al.

[11] Patent Number: 5,184,278
[45] Date of Patent: Feb. 2, 1993

[54] LIGHTING CONTROL AND EMERGY MANAGEMENT SYSTEM

[75] Inventors: Scott C. Jordan, Lexington; Robert L. Wolf, Winchester; Dennis W. Fleege; Jeffrey O. Sharp, both of Lexington, all of Ky.

[73] Assignee: Square D Company, Palatine, Ill.

[21] Appl. No.: 619,144

[22] Filed: Nov. 28, 1990

[51] Int. Cl.⁵ .............................................. H02B 1/01
[52] U.S. Cl. .................... 361/346; 361/393; 361/396; 361/353; 361/361
[58] Field of Search ............. 307/147, 148, 150; 361/341, 342, 346-348, 353-362, 376, 393, 396, 426

[56] References Cited

U.S. PATENT DOCUMENTS

| | | | |
|---|---|---|---|
| 4,783,718 | 11/1988 | Raabe et al. | 361/363 |
| 4,920,476 | 4/1990 | Brodsky et al. | 364/140 |
| 4,937,706 | 6/1990 | Schueller et al. | 361/393 |

OTHER PUBLICATIONS

Crestron Electronics publication on Creslite System 5, dated May 1989.

*Primary Examiner*—Gregory D. Thompson
*Attorney, Agent, or Firm*—Jose W. Jimenez; Robert J. Crawford; Larry I. Golden

[57] ABSTRACT

A modular energy management circuit breaker (EMCB) system is adapted for installation with existing panelboards. It comprises a bus way that includes a connector that is coupled to an interface module connector. The interface module, which extends across the panelboard, makes connection with the power bus and is connected to the panelboard by snap-in means. A control module is adapted to interengage with another connector in the interface module and to control a plurality of EMCBs. A bus way includes a plurality of connectors adjacent a plurality of circuit breaker positions which are connected to suitable circuits in the control module for controlling the drivers for the EMCBs. A terminal box is formed at the end of the control module and has provision for connecting a plurality of control wires to suitable terminating devices for interfacing external controlling devices to the control module. The bus way is supported adjacent the panelboard solely by means of the connectors connecting it to the interface module and to one or more EMCBs. All wiring to the energy management system is via printed circuit boards in the modules and interconnecting connectors.

3 Claims, 5 Drawing Sheets

LIGHTING CONTROL AND EMERGY MANAGEMENT SYSTEM

BACKGROUND OF THE INVENTION AND PRIOR ART

This invention relates generally to electrical distribution systems and specifically to a system for incorporating energy management circuit breakers (EMCBs) in new or existing panelboards.

It is common practice to use so-called EMCBs for remotely controlling the opening or closing of one or more branch electric circuits in response to an appropriate command signal. Command signals may be developed from any number of different controlling devices such as dry contact switches, low voltage switch contacts, power line carrier networks, thermostatic controls, radio frequency devices, etc. The controlling device supplies input signals to an interface device which, in turn, processes the input signals and develops driving power for operating a circuit breaker to an open or a closed position. The interface device may also be capable of indicating the breaker status on a remote panelboard or the like. Such systems may be used to preprogram a plurality of circuit breakers to operate lighting systems, security systems, manufacturing systems and the like.

EMCBs generally comprise a conventional circuit breaker with a drive mechanism attached thereto for opening and closing the breaker contacts, generally through the mechanism of an electric motor that is controlled by a control device. An EMCB is generally larger than its mechanical circuit breaker counterpart and requires more wiring space in the panelboard enclosure. The generally cramped quarters in the enclosure and the need to run low voltage control lines in proximity to the electrical power lines presents a major problem in developing a system that can be used with an existing panelboard installation. Another difficulty is that different manufacturers and users have particular requirements for the control mechanisms that interface between the controllers and the EMCBs. It is therefore desirable to provide a system that is modular in construction to enable its use with different types of control units.

OBJECTS OF THE INVENTION

A principal object of the invention is to provide a novel EMCB panelboard system.

Another object of the invention is to provide an EMCB panelboard system that is retrofittable on existing panelboards.

A further object of the invention is to provide a modular EMCB panelboard system that may readily utilize different control units and EMCB breaker types.

A still further object of the invention is to provide a retrofittable EMCB panelboard system that minimizes wiring clutter in the panelboard enclosure.

SUMMARY OF THE INVENTION

In accordance with the invention, a retrofittable EMCB panelboard system comprises a bus way that is supportable alongside a plurality of circuit breaker positions in a panelboard by means of an interface module and one or more remotely controllable EMCBs. The interface module connects to the power bus in the panelboard and includes a power supply for developing power for the control units and EMCB operating mechanisms. A control module is designed to couple with the interface module and to intercouple with a plurality of connectors that are incorporated in the bus way and positioned adjacent respective circuit breaker positions in the panelboard. Low voltage control wires are coupled to the control module via printed circuit boards and interconnecting connectors. The entire system is capable of plug-in connection without the use of tools. The interface module, power supply and control module occupy a number of breaker spaces and may be positioned at any location within the panelboard with the bus way being positioned at either the right or left hand side, or both.

BRIEF DESCRIPTION OF THE DRAWINGS

The invention and its various aspects will be understood by reading the following specification in conjunction with the drawings, in which.

DESCRIPTION OF THE PREFERRED EMBODIMENT

Figure 1:
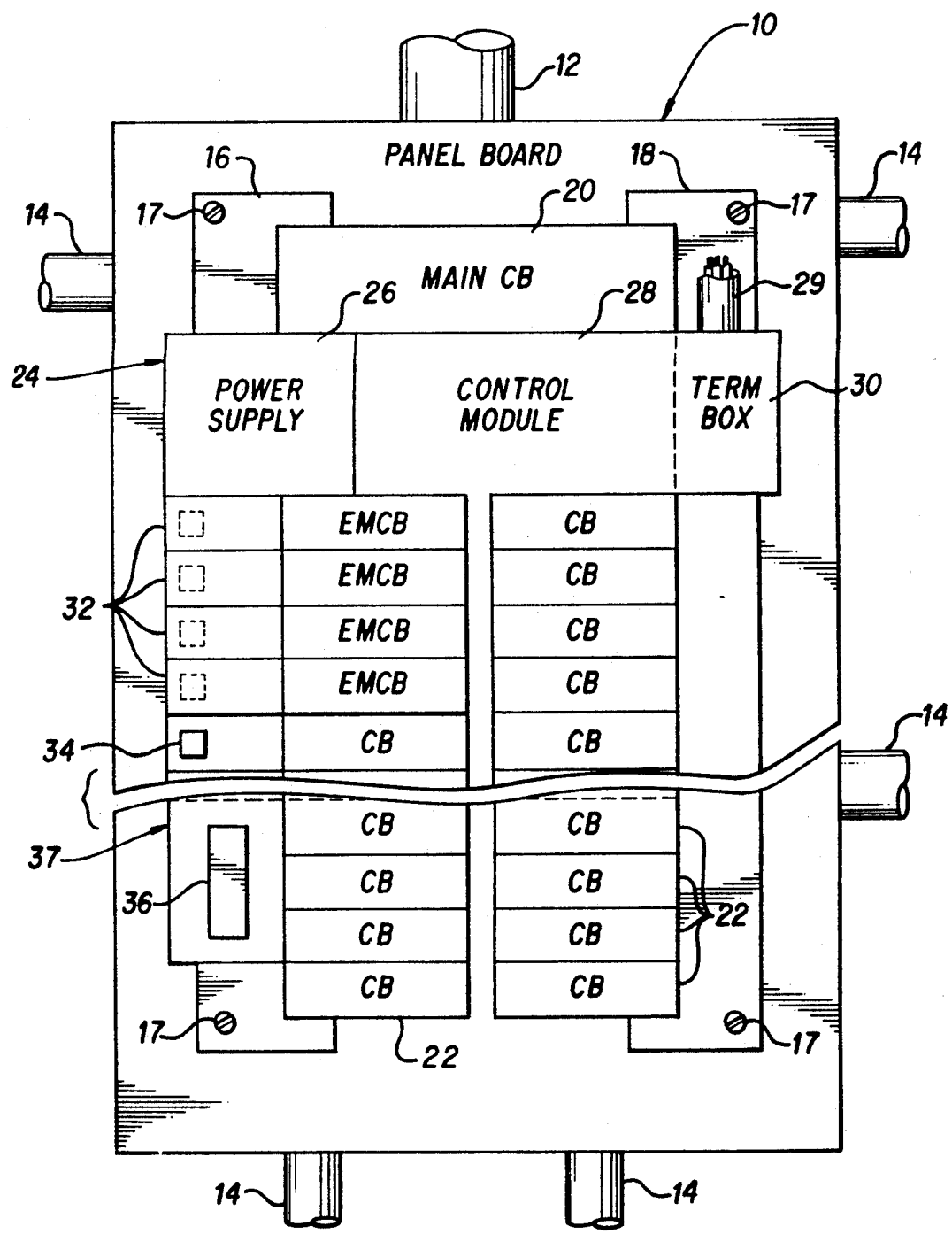
FIG. 1 is a simplified block diagram of a panelboard incorporating the invention.
Figure 2:
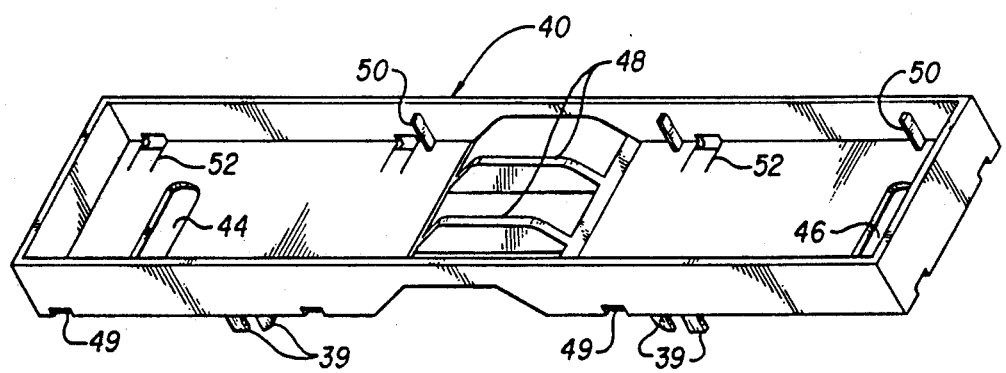
FIG. 2 is a perspective of an interface module base.
Figure 3:
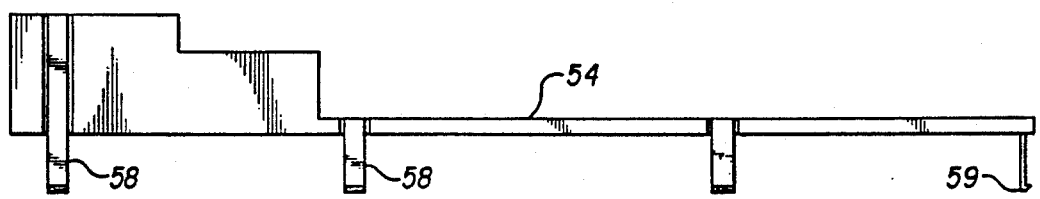
FIG. 3 is a side view of an interface module cover.

FIG. 1 illustrates a panelboard including an enclosure 10 in which an input conduit 12 is provided for housing the main input power lines from a source (not shown) and a plurality of output conduits 14 for distributing power to various circuits or branches (also not shown). A pair of mounting supports 16 and 18 are parallelly disposed on each side of enclosure 10 and mounted thereto by a plurality of suitable fasteners 17. The main power buses for providing electrical power to the various branch circuits are not illustrated but are well known and normally extend between mounting supports 16 and 18. A main circuit breaker 20 is shown. A plurality of circuit breakers 22, of conventional design, are shown in various locations on the panelboard. It will be appreciated by those skilled in the art that the panelboard defines a plurality of circuit breaker positions (actually two parallel rows of circuit breaker positions) in which an individual circuit breaker is installed by any conventional means. One end of the circuit breaker is generally mechanically and electrically coupled to one of the power rails by means of a suitable spring type connector (not shown) and, by means of a screw terminal connection, to a circuit wire that extends to the particular circuit being protected by the circuit breaker. An interface module assembly 24 is illustrated at the upper portion of enclosure 10, just below main circuit breaker 20. Interface module 24 includes a power supply 26 and supports a control module 28 that includes a terminal box 30. A bus way 37 extends along mounting support 16, but as will be explained, is not physically mounted thereto. The bus way includes lip portions that straddle raised portions of mounting support 16 for approximate location purposes. The bus way is secured in position by the interface module and one or more of the remotely controllable EMCBs 32, four of which are shown in installed position. The bus way 37 supports a plurality of connectors 34 (only one of which is shown in solid lines since the connectors are beneath the EMCBs 32) which are connected to a printed circuit board (not shown). The bus way also includes a pair of multi-pin connectors 36 (one of which is visible, the other being located beneath the power supply 26) which are electrically coupled to the various connectors 36. As has been briefly discussed, the bus way 37 may be positioned on either side of the panelboard since the connectors 36 are interchangeable. The interface module 24 may also be mounted at the bottom of the panelboard as well as at the top. As previously discussed, two bus ways may be used with a single interface module. In the embodiment illustrated, the interface module displaces six breaker positions in the panelboard. It should also be apparent that both EMCBs and conventional circuit breakers may be used together in the panelboard as the system requirements dictate. This is an important feature of the invention since it enables existing panelboards to be retrofitted with EMCBs with a minimum of wiring. As will be seen, the connections between the panelboard power bus and the interface module, the connections between the interface module and the power supply and the control module (including the termination box), and the EMCBs are provided by printed circuit boards and connectors with the result that there are no extraneous wires that need to be carefully positioned within the panelboard enclosure. Thus the possibility of contact between the control wires and the electrical power lines in the panelboard is minimized. The EMCBs include a mating connector that is mounted for limited movement parallel to the circuit breaker positions so that connector 34 may be readily engaged when installing the EMCB. The connector 36 and one or more of the connectors 34 serve to position and support bus way 37 adjacent to the panelboard.

Figure 7:
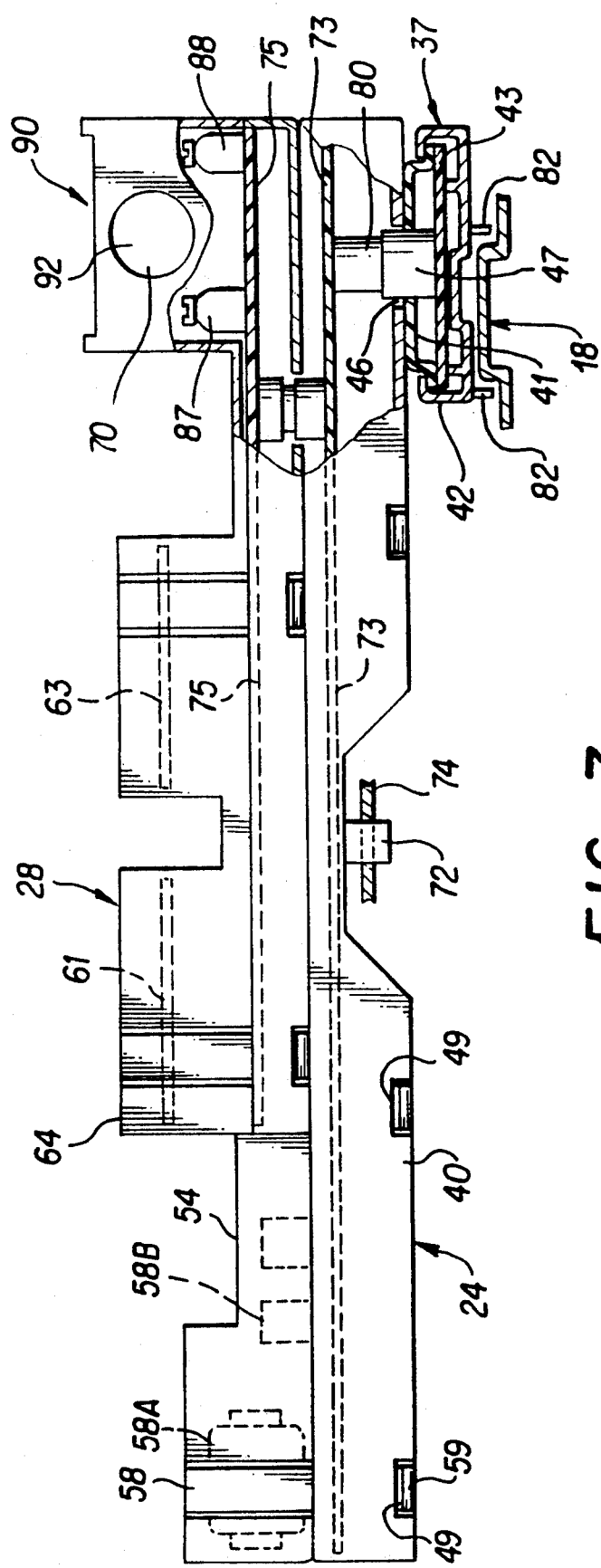
FIG. 7 is a partial cutaway view of the interface module and control unit mounted to the bus way.

FIGS. 2, 3, 4 and 7 show the general construction of an interface module housing constructed in accordance with the invention. Specifically, a base 40 and a cover 54 are formed of plastic with the base 40 having a pair of upstanding ribs 48 which straddle the phase barriers in the enclosure and define open spaces that enable the connection of power stabs that are mounted to the printed circuit board (neither shown) in the interface module to engage appropriate power rails in the panelboard. A plurality of upstanding ledges 50 are formed about the periphery of base 40 for supporting an interface module printed circuit board 73 (FIG. 7). A pair of apertures 44 and 46 are symmetrically located at the ends of base 40 for enabling a multi-pin connector 80 (FIG. 7) to extend from the printed circuit board to the bottom of interface module base 40. A pair of snap type connection devices 39 are illustrated for engaging appropriate apertures in the mounting supports 16 or 18 of the panelboard 10 for securing the interface module 24 to the panelboard without the need of fasteners. The base 40 includes cut out rectangular portions 49 at its lower edge for enabling snap fits with tangs 59 of corresponding legs 58 that depend from interface cover 54. The tangs 59 extend through the side apertures 49 in the base of interface module 40 and engage the underside thereof. Cut out portions 52 are cantilevered in the base of the interface module 40 for captivating the depending legs 58 when the tangs 59 are engaged. The cover 54 includes a cut out 56 for enabling access to another connector 84 (FIG. 7) which is mounted on the obverse side of the printed circuit board of the interface module. As shown in FIG. 7, a transformer 58A and one or more electrical components such as capacitor 58B are mounted on printed circuit board 73 and within cover 54.

Figure 4:
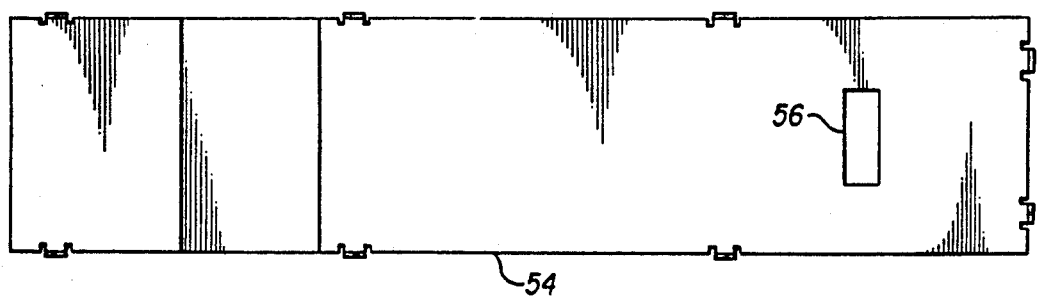
FIG. 4 is a top view of the interface module cover of FIG. 3.
Figure 5:
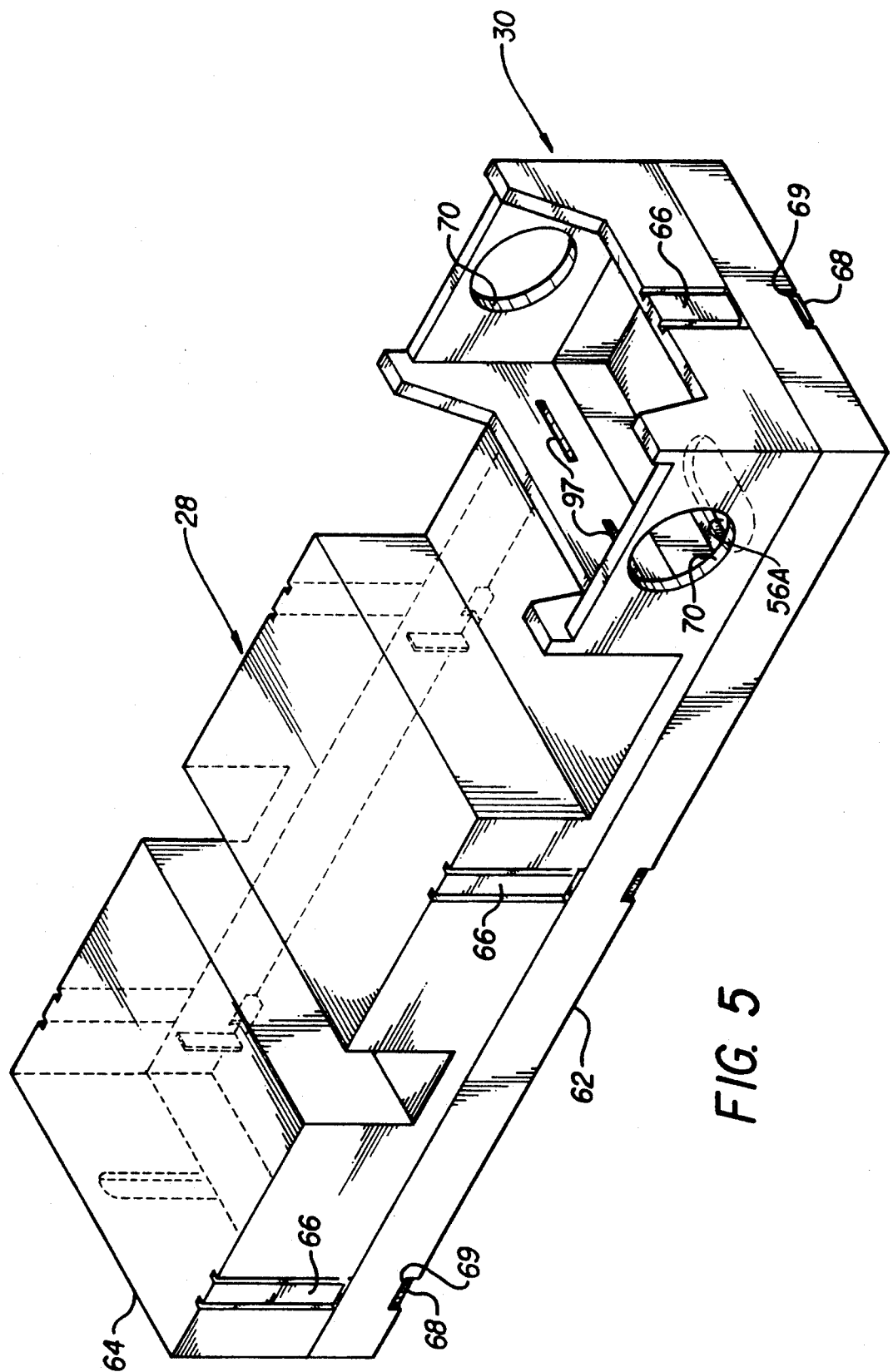
FIG. 5 is a perspective view of an assembled control module cover and base.
Figure 6:
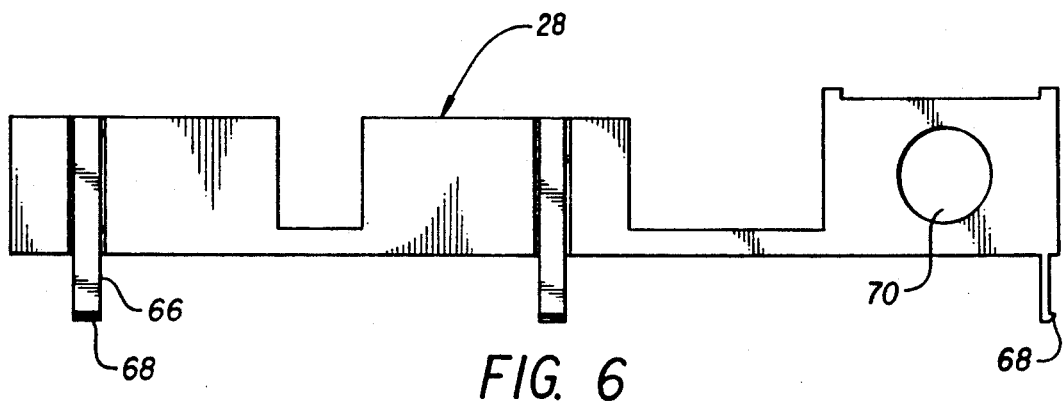
FIG. 6 is a side view of the control module cover.
Figure 9:
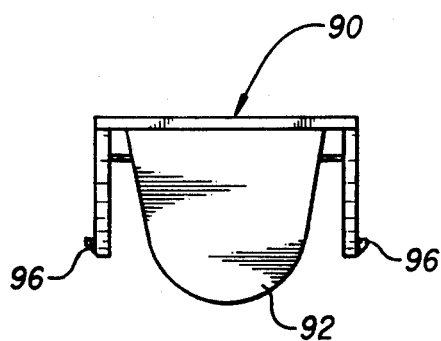
FIGS. 8 and 9 are views of a terminal box cover.
Figure 8:
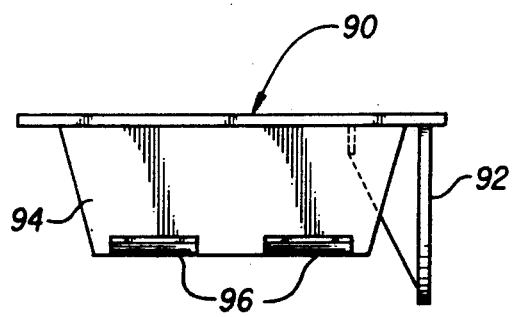

FIGS. 5 and 6 show a control module 28 having a base 62 and a cover 64, with the perspective of FIG. 5 illustrating cover 64 in position on base 62, and with FIG. 6 illustrating the side view of cover 64. The control module base 62 is attached to cover 64 by means of a plurality of depending legs 66 in the cover having tangs 68 that engage the underside of base 62 by means of a plurality of rectangular slots 69 formed therein. As is seen in FIG. 7, control module 28 includes means for supporting a number of printed circuit boards (61,63,75) therein as well as various electronic apparatus (not illustrated) for enabling inputs from various sensors to operate various drivers (not shown) for operating the EMCBs. A suitably shaped aperture 56A is partially visible in base 62 of control module 28 for enabling interconnection between connector 85 on printed circuit board 75 in the control module and connector 84 on the printed circuit board in the interface module 24 (see FIG. 7). Aperture 56A is arranged to overlie the corresponding aperture 56 in the interface module cover (FIG. 4). Terminal box 30 formed at the end of control module 28 includes upstanding wall members that define circular apertures 70 and 71 therein for enabling control wiring to enter from either side of the control module. As will be seen with reference to FIGS. 7, 8 and 9, a cap 90 is adapted to be placed over terminal box 30 and includes a panel for closing off one of the apertures 70 or 71, depending upon the point of entry of the control wiring.

Referring specifically to FIG. 7, a partially broken away view of assembled interface module 24 and control module 28 is shown in position on bus way 37. A pair of power stabs 72 (only one is visible) extend below the center of interface module 24 and are connected to printed circuit board 73 that is supported within interface module base 40. One of the power buses 74 in the enclosure 10 is shown in contact with power stab 72. As illustrated, bus way 37 preferably comprises a pair of plastic interlocking extruded channel members 41 and 42 which support a printed circuit board 43 therebetween. A connector 47 is supported on printed circuit board 43 and electrically coupled thereto and engages a mating connector 80 that is supported on printed circuit board 73 in interface module 24. The connector 47 extends through aperture 46 in the base 40 of interface module 24. Bus way 37 is in turn positioned along mounting support 18 by suitable depending members 82. Control module 28 is broken away to show printed circuit board 75 that supports connector 85 which engages connector 84 that is mounted to the printed circuit board 73 in the interface module 24. A plurality of screw-type terminals 87 and 88 are provided for interconnecting the control wires to the various conductive traces (not shown) on printed circuit board 75. A cap 90, best illustrated in FIGS. 8 and 9, engages the upstanding walls of terminal box 30 and includes a depending flap 92 that covers one of the apertures 70 and 71. The other aperture is coupled to a suitable conduit 29 as illustrated in FIG. 1 for housing the incoming low voltage control wires. The cap 90 includes a pair of oppositely disposed depending sides 94 having tangs 96 for engaging suitable recesses 97 in the inner wall surfaces of terminal box 30 (FIG. 7).

It will be appreciated by those skilled in the art that bus way 37 may be fabricated in three sections with the two end sections including connectors 36 that are engaged with appropriate conductive traces that interconnect with the various connectors 34 and to the interface module printed circuit board via connectors 47 and 80. It will also be recognized that the upper surface of the cover 64 of control module 28 may have mounted therein potentiometers, read out devices, or the like for enabling operating adjustments or status indications of the various devices controlled by the control module. All such modifications are believed well within the scope of the invention and should be apparent to those skilled in the art. The invention is to be limited only as defined in the claims.

What is claimed is:

1. A lighting control and energy management system comprising:
   an electrical panelboard having input and output power lines and a plurality of circuit breaker positions adjacent to said power lines which are arranged to receive a plurality of circuit breakers at least one of which is a remotely controllable circuit breaker;
   interface module means supportable on said panelboard and including thereon power supply means for supplying power by tapping into the input power lines;
   control module means, mounted to said interface module means and being supplied with power from said power supply means for controlling the operation of said remotely controllable circuit breaker using a printed circuit board to carry control signals to the corresponding circuit breaker position; and
   bus means including a plurality of connectors such that a connector is adjacent each of said plurality of circuit breaker positions, wherein the bus means couples said interface module means said remotely controllable circuit breaker occupying one of said plurality of circuit breaker positions.

2. The lighting control and energy management system of claim 1 wherein said bus means is secured by said interface module means.

3. The lighting control and energy management system of claim 2 wherein said interface module means includes mechanical snap means for engaging said panelboard and includes power stabs for electrically contacting said input power lines.

* * * * *